(12) United States Patent
Vink et al.

(10) Patent No.: US 10,043,273 B2
(45) Date of Patent: Aug. 7, 2018

(54) REGISTRATION OF TISSUE SLICE IMAGE

(71) Applicant: KONINKLIJKE PHILIPS N.V., Eindhoven (NL)

(72) Inventors: Jelte Peter Vink, Eindhoven (NL); Marinus Bastiaan Van Leeuwen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 26 days.

(21) Appl. No.: 15/029,786

(22) PCT Filed: Oct. 30, 2014

(86) PCT No.: PCT/EP2014/073277
§ 371 (c)(1),
(2) Date: Apr. 15, 2016

(87) PCT Pub. No.: WO2015/063192
PCT Pub. Date: May 7, 2015

(65) Prior Publication Data
US 2016/0232670 A1 Aug. 11, 2016

(30) Foreign Application Priority Data
Oct. 30, 2013 (EP) .................................... 13190876

(51) Int. Cl.
*G06K 9/00* (2006.01)
*G06T 7/00* (2017.01)
(Continued)

(52) U.S. Cl.
CPC .......... *G06T 7/0024* (2013.01); *G06K 9/0014* (2013.01); *G06T 7/0012* (2013.01); *G06T 7/11* (2017.01); *G06T 7/30* (2017.01); *G06T 7/33* (2017.01); *G06T 2207/10056* (2013.01); *G06T 2207/30024* (2013.01)

(58) Field of Classification Search
None
See application file for complete search history.

(56) References Cited

U.S. PATENT DOCUMENTS 8,369,600 B2    2/2013  Can
8,538,108 B2 *  9/2013  Shekhar ................ G06T 3/0081
                                                            378/901

(Continued)

FOREIGN PATENT DOCUMENTS

WO    2005101314 A2    10/2005

OTHER PUBLICATIONS

Chklovskii, Dmitri B. et al "Semi-Automated Reconstruction of Neural Circuits using Electron Microscopy", Science Direct—Neurobiology, vol. 20, No. 5, 2010, pp. 667-675.

(Continued)

*Primary Examiner* — Hadi Akhavannik

(57) ABSTRACT

A method for registration of images of tissue slices comprises: receiving a first image (18a) of a first tissue slice (14a) and a second image (18b) of a second tissue slice (14b), both tissue slices being prepared from the same tissue block (10); determining an unreliable area (27) in the first image (14a) showing folded tissue (15); and registering the first image (14a) and the second image by registering an area of the first image and the second image outside of the unreliable area.

13 Claims, 3 Drawing Sheets

(51) Int. Cl.
*G06T 7/30* (2017.01)
*G06T 7/33* (2017.01)
*G06T 7/11* (2017.01)

(56) References Cited

U.S. PATENT DOCUMENTS

| | | |
|---|---|---|
| 2003/0039384 A1 | 2/2003 | Bacus |
| 2003/0048931 A1 | 3/2003 | Johnson |
| 2003/0216631 A1* | 11/2003 | Bloch ................... G06T 3/0081 600/407 |
| 2005/0123181 A1 | 6/2005 | Freund |
| 2008/0095422 A1* | 4/2008 | Suri ..................... G06K 9/6206 382/131 |
| 2008/0161687 A1* | 7/2008 | Suri ..................... A61B 8/0833 600/437 |
| 2009/0010540 A1* | 1/2009 | Mullick ................... G06T 7/38 382/170 |
| 2010/0093023 A1 | 4/2010 | Gustafsson |
| 2011/0178389 A1* | 7/2011 | Kumar .................. A61B 5/055 600/411 |
| 2012/0045790 A1* | 2/2012 | Van Dijk .............. G06T 7/0014 435/29 |
| 2013/0230228 A1* | 9/2013 | Leung ................... G06T 7/0012 382/132 |

OTHER PUBLICATIONS

Mueller, D. et al "Real-Time Deformable Registration of Multi-Modal Whole Slides for Digital Pathology", Computerized Medical Imaging and Graphics, vol. 35, 2011, pp. 542-556.

Kaynig, V. et al "Probabilistic Image Regisration and Anomaly Detection by Nonlinear Warping", Computer Vision and Pattern Recognition, 2008, pp. 1-8.

* cited by examiner

REGISTRATION OF TISSUE SLICE IMAGE

CROSS-REFERENCE TO PRIOR APPLICATIONS

This application is the U.S. National Phase application under 35 U.S.C. § 371 of International Application No. PCT/EP2014/073277, filed on Oct. 30, 2014, which claims the benefit of European Patent Application No. 13190876.6, filed on Oct. 30, 2013. These applications are hereby incorporated by reference herein.

FIELD OF THE INVENTION

The invention relates to a method, a computer program, a computer-readable medium and a device for registration of images of tissue slices.

BACKGROUND OF THE INVENTION

Pathology diagnostic investigation of patient material (tissue and cells) is the basis of many treatment decisions, in particular in oncology. Usually, thin slices from a biopsy are presented on microscope slides and stained according to certain protocols. Specific stains are used for scoring and grading the possibly present type of cancer. As the number of stains applied to a single slide is rather limited due to overlapping frequencies in the visual spectrum (especially in bright field microscopy), consecutive slices are used, each differently stained. In traditional pathology, the information of one slide is transferred to the next slide only in a figurative sense. Quickly alternating between multiple slides is impossible, as it requires to switch the physical slides and to find the region of interest. Therefore, registration of multiple slides has to be done in one's head by the operator (e.g. a pathologist).

With the introduction of digital scanners, image analysis tools may help the pathologists to register the (consecutive) slides. However, general registration techniques as global registration may not work due to differences in the tissue, deformation of the tissue, stretching of the tissue, etc. More advanced registration techniques such as local registration do not require a single (global) transformation matrix and permit local adaptation.

SUMMARY OF THE INVENTION

Furthermore, the registration step may need to be robust for artefacts. Normally, artefacts (e.g. staining or imaging artefacts) appear locally, such that these areas are for example neglected and the rest of the image of the tissue slide is used for the registration. However, this approach may not hold in case of folded tissue. Folded tissue does not only effect the local (spatial) area where the folded tissue is visible, but may also cause the absence of tissue elsewhere and potentially some local stretching and deformation of the tissue.

There may be a need for a registration method for registration of tissue slice images with respect to each other, which takes local artefacts into account.

Such a need may be met by the subject-matter of the independent claims. Further embodiments of the invention are evident from the dependent claims and the following description.

An aspect of the invention relates to a method for registration of images of tissue slices for pathology diagnostic investigation. For example, the tissue slices have been prepared from one tissue block. Furthermore, the tissue slices may have been stained differently. It has to be understood that the term "registration" may mean that two images (showing a similar or the same content) are globally moved (rotated, scaled and/or moved) and/or locally deformed, such that their content is overlapping as good as possible.

According to an embodiment of the invention, the method comprises the steps of: receiving a first image of a first tissue slice and a second image of a second tissue slice, both tissue slices prepared from the same tissue block; determining an unreliable area in the first image showing folded tissue; and registering the first image and the second image by registering areas of the first image and the second image outside of the unreliable area to find region of interest.

It has to be understood that folds may appear in both images. In this case, unreliable areas may be determined in the first image and the second image and the registering of both images may be based on registering areas of the first image and the second image outside of the unreliable areas.

For example, two images of optionally differentially stained tissue slices (which may be consecutive slices from the tissue block) are locally registered by taking regions/ areas with folded tissue into account. These regions, for example, may be determined by looking for very dark areas (for examples areas with low pixel intensity) that may have pixel intensities below a threshold value. The content of such an unreliable area or excluded area, which may be stored in a mask image, may be ignored during the local registration of the two images, which may enhance the registration of the rest of the images. It has to be understood that the unreliable area may contain areas with folded tissues in both images (i.e. the first and the second image).

The method provides a robust registration, which takes tissue folds into account. Misalignment areas of the images where tissue is folded may be reduced.

Further aspects of the invention relate to a computer program, which, when being executed by a processor, is adapted for performing the steps of the method as described in the above and in the following, and a computer-readable medium, on which such a computer program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code.

A further aspect of the invention relates to an image processing device adapted for performing the steps of the method as described above and in the following. For example, the PC may be a PC running corresponding software that also may be adapted to display the received and generated images. Another possibility is that a server preprocesses the images for producing the overlay image that may be displayed on a client computer.

It has to be understood that features of the device as described in the above and in the following may be features of the method, computer program and the computer-readable medium as described in the above and in the following as well as vice versa.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

The reference symbols used in the drawings, and their meanings, are listed in summary form in the list of reference signs. In principle, identical parts are provided with the same reference symbols in the figures.

DETAILED DESCRIPTION OF EMBODIMENTS

Figure 1:
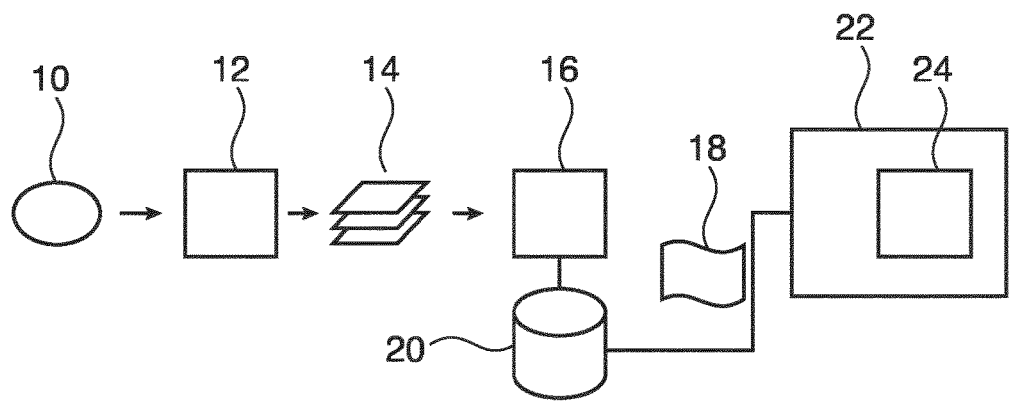
FIG. 1 schematically shows a system for preparing tissue slices and for registering images of the tissue slices according to an embodiment of the invention.

FIG. 1 shows a system for preparing tissue slices 14 and for registering images 18. A tissue block (paraffin block) 10 is sliced into tissue slices 14 that are stained in a slicing and staining device 12. The slices 14 may be put onto object carriers and are scanned/digitized with a scanning device 16. The scanned images 18 may be stored in a database 20 or may be directly processed by an image processing device 22, which processes the images 18 as will be explained in the following. The processed images 18 as well as further images may be displayed on a display 24 of the image processing device 22. The image processing device may be a PC or a server or a combination therefrom.

Figure 2:
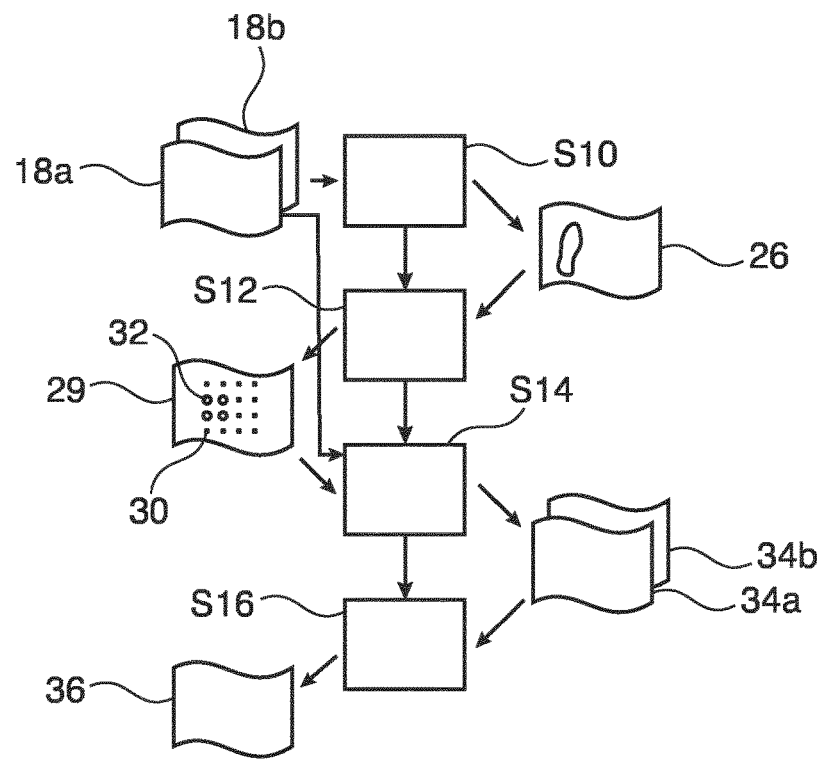
FIG. 2 shows a flow diagram for a method for registration of images of tissue slices according to an embodiment of the invention.

FIG. 2 shows a flow diagram for a method that may be executed by the image processing device 22. For example, the method is implemented in suitable software running on the image processing device 22.

Figure 3A:
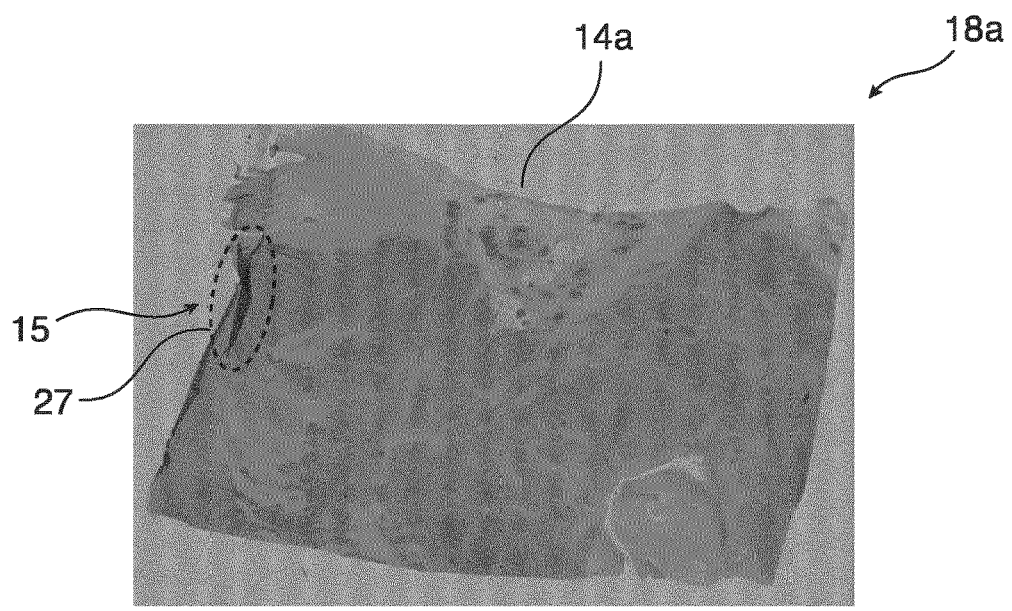
FIGS. 3A and 3B show images with tissue slices that may be processed in a method for registration of images of tissue slices according to an embodiment of the invention.
Figure 3B:
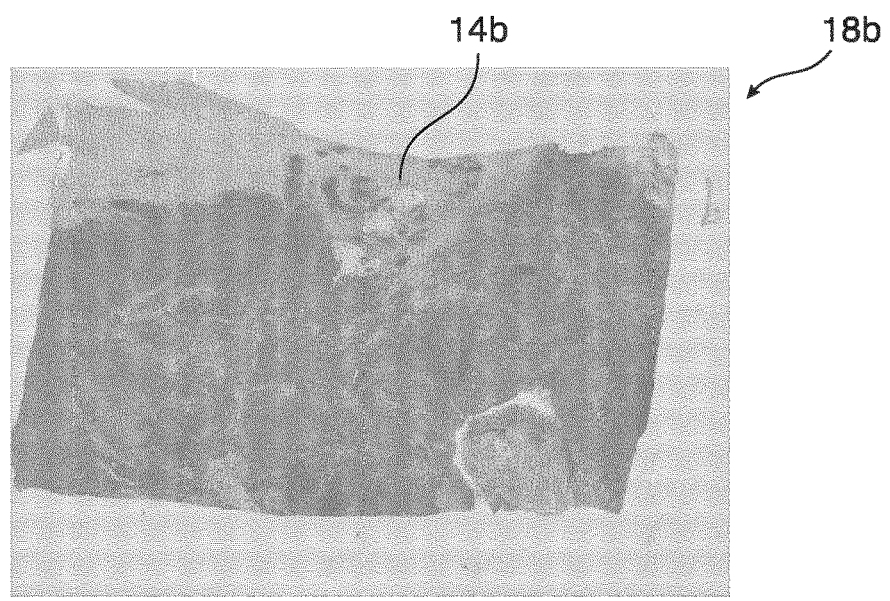

In step S10, the two images 18a, 18b are received. As shown in FIG. 3A and FIG. 3B, the images 18a, 18b may be digital images (in greyscale, colored or in general with n channels) having pixels with at least one intensity value associated to each pixel. Both images 18a, 18b show tissue slices 14a, 14b, which usually are prepared from the same tissue block (paraffin block) 10. Furthermore, the two slices may have been stained with different staining agents.

As shown in FIG. 3A, the image 18a of slice 14a contains folded tissue. It has to be understood that folded tissue may be a region, in which the slice 14a is not extending flat in the image 18, i.e. may be wrapped around, may be wavy or may be compressed very strong.

After the two images 18a, 18b have been received, one or more unreliable areas 27 are determined or detected in the first image 18a. It is furthermore possible that also one or more unreliable areas are also determined in the second image 18b. A detection of folded tissue may be done by searching for very dark regions and/or regions with sharp edges.

Figure 4:
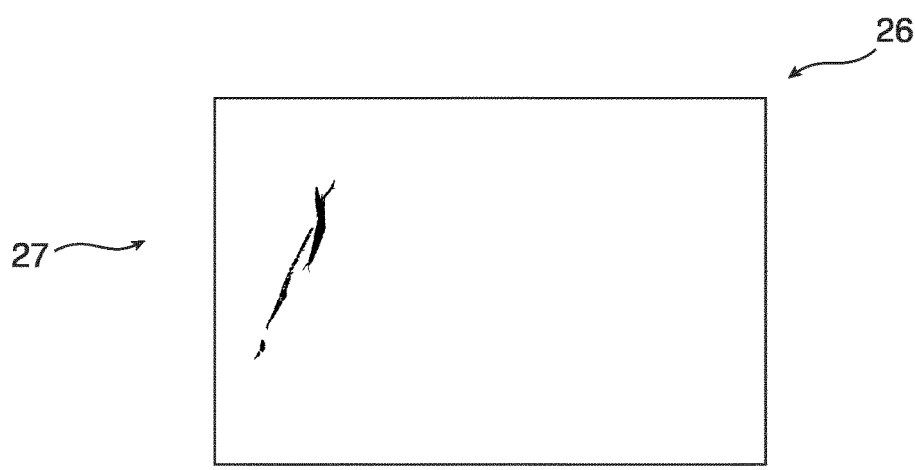
FIGS. 4 and 5 show mask images that may be used in a method for registration of images of tissue slices according to an embodiment of the invention.

For example, the unreliable area 27 is provided as a mask image 26 as shown in FIG. 4. It is possible that both images 18a, 18b have folds. In this case, there may be a mask image for each of the images 18a, 18b, which may be merged to one overall mask image 26. To combine both masks, the registration of both images 18a and 18b may have to be performed.

The mask image 26 may be an image having only two intensity values indicating unreliable pixel or reliable pixel. For example, the mask image 26 may be generated by comparing the intensity values of the first image with a threshold value.

To distinguish normal tissue from folded tissue one can exploit the fact that tissue folds result in a significant increase in the amount of tissue in the light path, and therefore appear with a relatively low intensity (in case of bright field microscopy). Another visual characteristic feature of folds is that the resulting variation in intensity will be abrupt (sharp intensity change at the borders of the fold). Methods to detect these folds may comprise a global analysis of the image 18a, 18b for previously mentioned characteristics, i.e. may comprise detecting a low intensity in the first image 18a (and second image 18b) associated with a tissue fold and/or an intensity change in the first image 18 (and the second image 18b) associated with a tissue fold.

Figure 5:
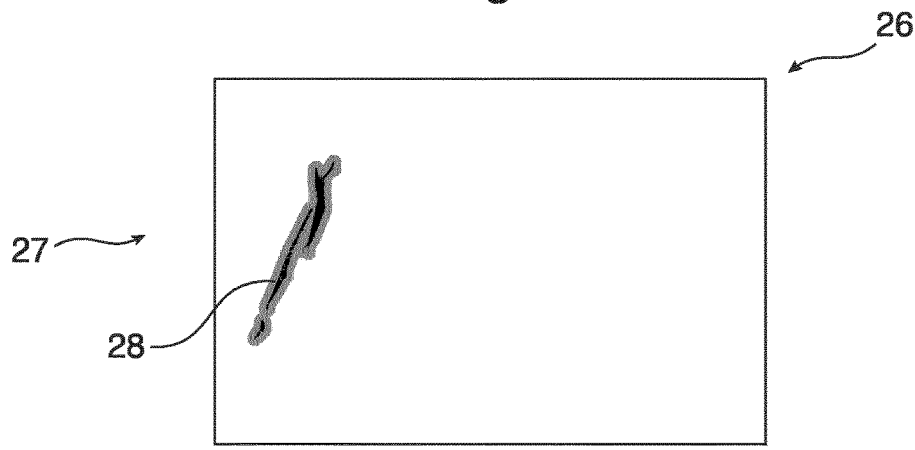

Furthermore, as shown in FIG. 5, the unreliable area may be enlarged with a margin 28 around the unreliable area. For example, the created mask in the mask image 26 may be extended. An approach is to dilate the mask, using the dimensions of the found area to control the structuring element.

The unreliable area may be provided with a margin 28 of predefined width, for example by substituting each pixel of the mask by a circle with the width as diameter. It is also possible to derive the margin 28 from a dimension of the unreliable area 27 and/or the tissue fold, for example a minor-axis in the case of an elongated fold.

In step S12, a transformation (for example expressed using a matrix) and/or control grid 29 is determined that will be used for the registration of the slides 18a, 18b in the next step. The grid 29 comprises two types of control points or knots, i.e. reliable points 30 and unreliable points 32. The term "reliable" may mean that a corresponding area, point or pixel patch may reliably be used for registration of the two images 18a, 18b. The points of the control grid 29 are classified by making use of the created mask in the mask image 26.

Figure 6:
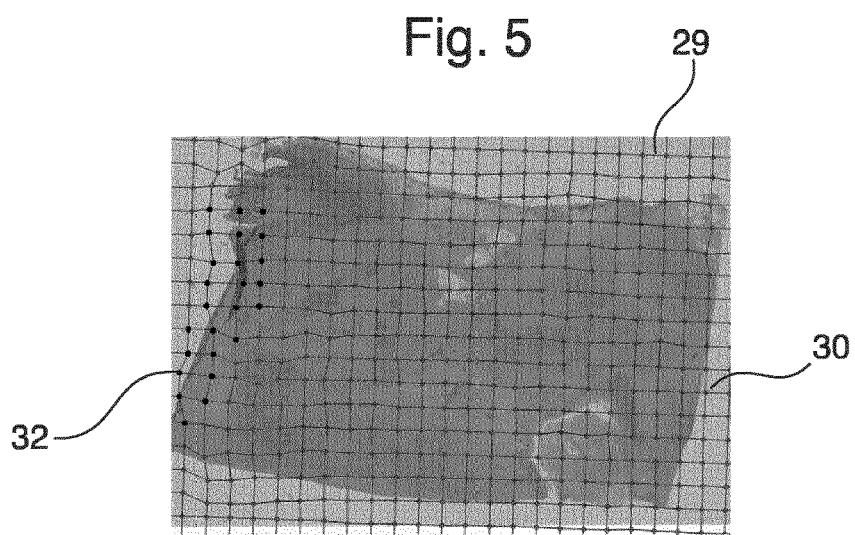
FIG. 6 shows a grid on a tissue slice image determined by a method for registration of images of tissue slices according to an embodiment of the invention.

An example of such a control grid 29 is shown in FIG. 6. The grid 29 may be a regular grid 29, for example with a rectangular or square pattern of points 30, 32. The reliable control points 30 may be positioned outside the unreliable area 27. The unreliable control points 30 may be the remaining points of the grid 29.

In step S14, the two images 18a, 18b are registered with each other by registering the area of the first image and the second image outside of the unreliable area 27 and by treating the unreliable area differently.

In one approach, the unreliable area 27 in the image 18a is ignored, when registering the two images 18a, 18b.

When using the approach with the control grid 29, for the reliable control points 30 (and possibly for the unreliable control points 32), a new position is determined.

This may be achieved by applying a B-spline transformation. This is typically done by finding the local deformation of the tissue within a window comprising a control point 30, 32 (for example, the control point 30, 32 may be the center of the window). In principle, a relative local deformation of the first image 18a and second image 18b may be determined at a reliable control point 30 based on a part of the image around the control point. A relative local deformation may be defined by a shift of the control points 30, 32 between its position in the first image 18a and its position in the second image 18c.

The unreliable control points 32 may be treated differently from the reliable control points:

In one case, the unreliable control points 32 may be neglected.

In a further case, a relative local deformation of the first image 14a and the second image 14b at an unreliable control point 32 may be based on a part of the image outside the unreliable area 27. In other words, the new position of the unreliable control points 32 may be determined using the tissue, which is not selected by the mask image as unreliable.

Furthermore, the local deformation determined for reliable control points 30 may be extrapolated or interpolated in order to determine the new positions of the unreliable control points 32.

Also, the unreliable control points 32 may be treated as endpoints of the B-spline.

In step S16, the information collected during registration may be applied to the image 18, for example, the determined local deformations may be applied to the image 18a, resulting on an deformed image 34a. It is also possible that both images 18a, 18b are deformed (for example by applying half of the local deformation in opposite directions). Thus, also a deformed image 34b may be generated.

If the registration is based on the grid 29, the local transformations associated with the grid 29 may be applied.

Furthermore, it is possible that the images 34a and 18b (or 34b) are overlayed with each other, i.e. that an image 36 is created by blending the two images. Also other methods for visualization are possible. For example, the two images 18, 18b may be shown together in the form of a checkerboard, i.e. may be divided into small rectangles like a checkerboard, wherein the "black" rectangles are taken from the one image 18a and the "white" rectangles are taken from the other image 18b.

In the end, the image 34a or the image 36 may be displayed on the display 24.

Also the created mask image may be overlayed with the image 18a, 34a or 36 (possibly after applying the local deformation to the mask) and may be displayed to indicate the unreliable tissue area. Also, the extended margin of the non-registered region around the folded tissue may be visualized in overlay.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SIGNS

10 tissue block
12 slicing and staining device
14 tissue slices
14a first tissue slice
14b second tissue slice
15 folded tissue
16 imaging device
18 images
18a first image
18b second image
20 database
22 image processing device
24 display
26 mask image
27 unreliable area
28 margin
29 grid
30 reliable control point
32 unreliable control point
34a deformed image
34b deformed image
36 overlay image

The invention claimed is:

1. A method for registration of images of tissue slices for pathology diagnostic investigation, the method comprising:
   receiving a first image of a first tissue slice and a second image of a second tissue slice, the first and second tissue slices being prepared from the same tissue block;
   determining an unreliable area in the first image showing folded tissue;
   providing a set of control points with a regular grid;
   selecting reliable control points outside the unreliable area; and
   registering the first image and the second image by registering an area of the first image and the second image outside of the unreliable area by determining a relative local deformation of the first image and the second image at the reliable control points based on a part of the first image and the second image around the control points.

2. The method of claim 1, further comprising:
   selecting unreliable control points inside the unreliable area; and
   determining a relative local deformation of the first image and the second image at an unreliable control point based on a part of the first image and the second image outside the unreliable area.

3. The method of claim 1, further comprising:
   determining a relative local deformation at an unreliable control point by extrapolating or interpolating the local deformation of the first image and second image at the reliable control points in a local area around the unreliable control point.

4. The method of claim 1, further comprising:
   neglecting unreliable control points during registering the first image and the second image.

5. The method of claim 1,
   wherein the unreliable area showing folded tissue is provided by a mask image.

6. The method of claim 1,
   wherein the unreliable area is determined based on:
   a low intensity in the first image associated with the folded tissue; and/or
   an intensity change in the first image associated with the folded tissue.

7. The method of claim 1, further comprising:
   enlarging the unreliable area with a margin around the unreliable area.

8. The method of claim 1,
   wherein the first image and the second image are digital images having pixels with at least one intensity value associated to each pixel.

9. The method of claim 5, further comprising:
overlaying at least two images selected from the first image, the second image and the mask image with the unreliable area.

10. The method of claim 9,
wherein the first tissue slice is differently stained as the second tissue slice.

11. A computer program, which, when being executed by a processor, is adapted for performing the steps of the method claim 1.

12. The method of claim 7, wherein the margin is derived from a dimension of the unreliable area.

13. A non-transitory computer-readable medium storing a computer program that, when executed by a computer processor, registers images of tissue slices for pathology diagnostic investigation, the computer-readable medium comprising:

receiving code for receiving a first image of a first tissue slice and a second image of a second tissue slice, the first and second tissue slices being prepared from the same tissue block;

determining code for determining an unreliable area in the first image showing folded tissue;

providing code for providing a set of control points with a regular grid;

selecting code for selecting reliable control points outside the unreliable area; and registering code for registering the first image and the second image by registering an area of the first image and the second image outside of the unreliable area by determining a relative local deformation of the first image and the second image at the reliable control points based on a part of the first image and the second image around the control points.

* * * * *